(12) United States Patent
Wan et al.

(10) Patent No.: US 11,682,014 B2
(45) Date of Patent: *Jun. 20, 2023

(54) METHOD AND APPARATUS FOR OPERATING BLOCKCHAIN SYSTEM, DEVICE AND STORAGE MEDIUM

(71) Applicant: BEIJING BAIDU NETCOM SCIENCE TECHNOLOGY CO., LTD., Beijing (CN)

(72) Inventors: Chunhui Wan, Beijing (CN); Tong Jin, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/806,461

(22) Filed: Jun. 10, 2022

(65) Prior Publication Data

US 2022/0398580 A1 Dec. 15, 2022

(30) Foreign Application Priority Data

Jun. 11, 2021 (CN) .......................... 202110652734.8

(51) Int. Cl.
*G06Q 20/40* (2012.01)
*G06Q 20/38* (2012.01)

(52) U.S. Cl.
CPC ......... *G06Q 20/401* (2013.01); *G06Q 20/381* (2013.01); *G06Q 20/389* (2013.01)

(58) Field of Classification Search
CPC ... G06Q 20/401; G06Q 20/381; G06Q 20/389
See application file for complete search history.

(56) References Cited

U.S. PATENT DOCUMENTS 10,505,720 B2 * 12/2019 Li .......................... H04L 9/0643
2017/0093700 A1 * 3/2017 Gilley ..................... H04L 69/08
(Continued)

FOREIGN PATENT DOCUMENTS

| CN | 109558115 A | * | 4/2019 |
| CN | 109558115 A |   | 4/2019 |

(Continued)

OTHER PUBLICATIONS

Bhutta et al., A Survey on Blockchain Technology: Evolution, Architecture and Security, Mar. 2, 2021; IEEE Access; vol. 9; pp. 61048-61073 (Year: 2021).*

(Continued)

*Primary Examiner* — John W Hayes
*Assistant Examiner* — Yingying Zhou
(74) *Attorney, Agent, or Firm* — Hunton Andrews Kurth LLP

(57) ABSTRACT

Provided are a method and apparatus for operating a blockchain system, a device and a storage medium. The method is described below. To-be-processed blockchain data is acquired through a kernel engine of the blockchain system. The to-be-processed blockchain data is processed through the kernel engine, a consensus component call request is generated according to a consensus component interface during a processing process of the to-be-processed blockchain data, and a corresponding consensus component is called according to the consensus component call request, where the corresponding consensus component is configured to execute a consensus mechanism between blockchain nodes.

12 Claims, 7 Drawing Sheets

(56) References Cited

U.S. PATENT DOCUMENTS

| | | | | |
|---|---|---|---|---|
| 2018/0352033 A1* | 12/2018 | Pacella | .................. | H04L 67/10 |
| 2020/0159721 A1* | 5/2020 | Zhuang | .................. | G06F 9/467 |
| 2021/0366586 A1* | 11/2021 | Ryan | .................... | G06Q 20/389 |
| 2021/0407001 A1* | 12/2021 | Yang | ...................... | G06Q 40/04 |

FOREIGN PATENT DOCUMENTS

| | | | | |
|---|---|---|---|---|
| CN | 110602116 A | * | 12/2019 | ......... G06Q 20/4014 |
| CN | 110795227 A | | 2/2020 | |
| CN | 111338604 A | | 6/2020 | |
| CN | 111651467 A | | 9/2020 | |
| CN | 111736922 A | | 10/2020 | |
| CN | 111831269 A | | 10/2020 | |
| CN | 112035575 A | | 12/2020 | |

OTHER PUBLICATIONS

Antonopoulos, Mastering Bitcoin: Unlocking Digital Cryptocurrencies, Dec. 2014, O'Reilly Media, Inc., 1st Edition, Chapter 3 and 8 (Year: 2014).*

"Decision to Grant a Patent, The State Intellectual Property Office of People's Republic of China, issued to CN Application No. 202110652743.8, 3 pages."

"First Chinese Office Action, The State Intellectual Property Office of People's Republic of China, issued to CN Application No. 202110652743.8, 15pages."

"First Chinese Search Report, from The State Intellectual Property Office of People's Republic of China, issued to CN Application No. 202110652743.8, dated Jun. 11, 2021, 2 pages."

"Looking back at the development of Blockchain in China in 2018, Monographic Research, Software and Integrated Circuit, 23 pages."

"Open atom superchain dynamic core XuperCore core technology revealed, InfoQJava, (May 19, 2021), 9 pages."

"Second Chinese Office Action, The State Intellectual Property Office of People's Republic of China, issued to CN Application No. 202110652743.8, 13 pages."

* cited by examiner

METHOD AND APPARATUS FOR OPERATING BLOCKCHAIN SYSTEM, DEVICE AND STORAGE MEDIUM

CROSS-REFERENCE TO RELATED APPLICATION(S)

This application claims priority to Chinese Patent Application No. 202110652734.8 filed Jun. 11, 2021, the disclosure of which is incorporated herein by reference in its entirety.

TECHNICAL FIELD

The present disclosure relates to the field of computer technologies and, in particular, the blockchain technology.

BACKGROUND

The blockchain industry continues to develop rapidly, and main application scenes of the blockchain technology in early stages of development are still focused on digital currencies and games. At present, the blockchain technology has entered a new stage of comprehensively exploring and empowering the industry from serving as the underlying technology that supports digital currencies.

At present, the mainstream blockchain implementation schemes have clear application scenes. Most of the conventional schemes are oriented to application scenes of digital currencies, and thus they are more suitable for the application of digital currencies. Therefore, in actual business scenes, the conventional schemes will encounter problems in applicability, the solution of which requires in-depth reconstruction on the framework. This reconstruction needs high costs and technical thresholds.

However, the manner of in-depth reconstruction on the framework makes the reconstruction difficult and costly, and after the reconstruction, the latest update corresponding to the framework cannot be automatically followed up.

SUMMARY

The present disclosure provides a method and apparatus for operating a blockchain system, a device and a storage medium, so as to improve the applicability of the blockchain to different scenes and reduce the development difficulty and cost.

According to an aspect of the present disclosure, a method for operating a blockchain system is provided. The method includes steps described below.

To-be-processed blockchain data is acquired through a kernel engine of the blockchain system.

The to-be-processed blockchain data is processed through the kernel engine, a consensus component call request is generated according to a consensus component interface during a processing process of the to-be-processed blockchain data, and a corresponding consensus component is called according to the consensus component call request, where the corresponding consensus component is configured to execute a consensus mechanism between blockchain nodes.

According to another aspect of the present disclosure, an apparatus for operating a blockchain system is provided. The apparatus includes a to-be-processed blockchain data acquisition module and a consensus component call request generation module.

The to-be-processed blockchain data acquisition module is configured to acquire, through a kernel engine of the blockchain system, to-be-processed blockchain data.

The consensus component call request generation module is configured to process, through the kernel engine, the to-be-processed blockchain data, generate a consensus component call request according to a consensus component interface during a processing process of the to-be-processed blockchain data, and call a corresponding consensus component according to the consensus component call request, where the corresponding consensus component is configured to execute a consensus mechanism between blockchain nodes.

According to another aspect of the present disclosure, an electronic device is provided. The electronic device includes at least one processor and a memory communicatively connected to the at least one processor.

The memory stores instructions executable by the at least one processor to cause the at least one processor to perform the method for operating a blockchain system of any one of embodiments of the present disclosure.

According to another aspect of the present disclosure, a non-transitory computer-readable storage medium is further provided. The non-transitory computer-readable storage medium stores computer instructions for causing a computer to execute the method for operating a blockchain system according to any one of the embodiments of the present disclosure.

According to another aspect of the present disclosure, a computer program product is provided. The computer program product includes a computer program which, when executed by a processor, implements the method for operating a blockchain system of any one of the embodiments of the present disclosure.

According to the technical solution of the embodiments of the present disclosure, the scalability and applicability of the blockchain implementation scheme can be improved, and thereby the development cost of the blockchain technology is reduced.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure.

DETAILED DESCRIPTION

Figure 1:
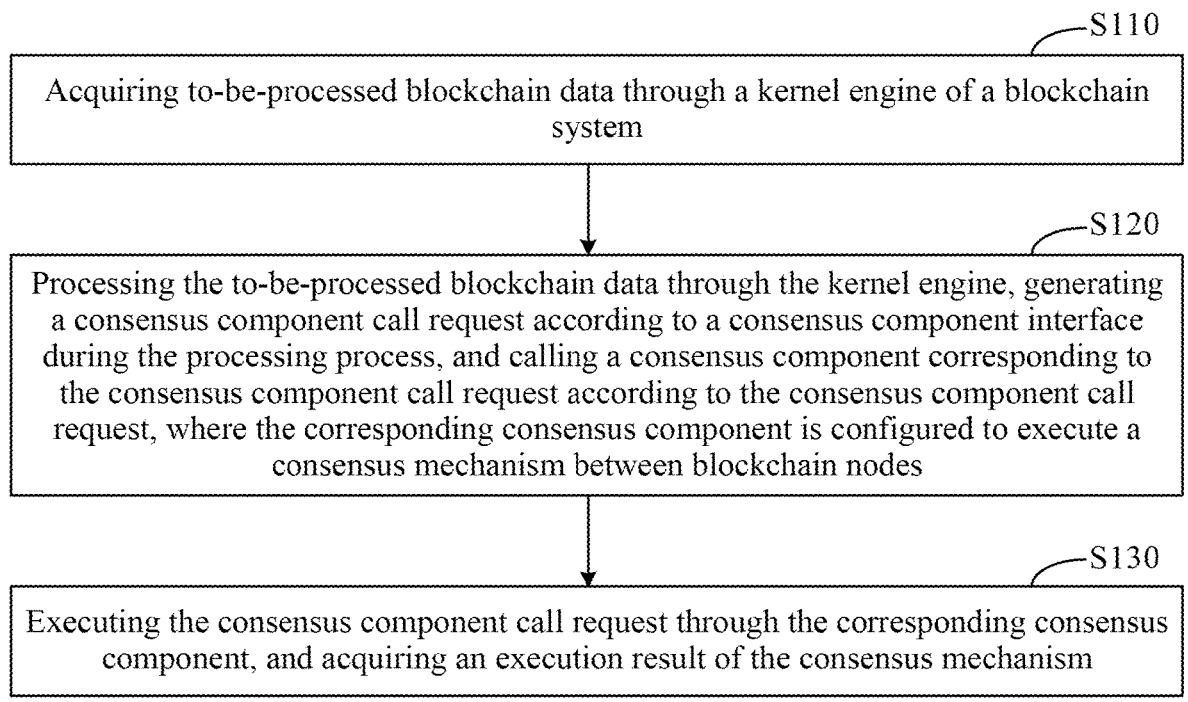
FIG. 1 is a diagram showing a method for operating a blockchain system according to an embodiment of the present disclosure.

Example embodiments of the present disclosure, including details of embodiments of the present disclosure, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

The method for operating a blockchain system provided by the embodiments of the present disclosure is provided on the basis of the blockchain kernel architecture constructed by the inventor.

A blockchain system as a whole may be divided into two parts, that is, the blockchain kernel architecture and the blockchain application layer, respectively. The blockchain application layer is for users to implement specific business requirements based on the blockchain system, and the blockchain application layer shields users from the complex blockchain underlying technology, so that a blockchain can be built to satisfy the business requirements as long as the users understand the basic principles of the blockchain. The server function of the blockchain application layer may be implemented by main programs of the blockchain system. The blockchain application layer may further include a client and an application programming interface (API) to provide a user interaction interface or interaction mechanism, so as to achieve interaction with the users. In a blockchain system, the business function of one or more blockchain application layers may be supported. The client or API of the application layer may interact with the blockchain kernel architecture through proprietary components. The proprietary components, for example, implement monitoring services for set interaction ports.

The present disclosure pays more attention to the kernel architecture of the blockchain. The kernel architecture includes at least a kernel engine layer and a kernel component layer, and the kernel architecture may further include a basic component layer. The kernel engine layer defines core flows of the blockchain kernel, that is, core flows of various kinds of business logic in the operation process of the blockchain, such as a deal processing flow, a miner block generation flow and a block synchronization flow. In the embodiments of the present disclosure, the so-called deal is a transaction request initiated by a blockchain user needing to be processed by a blockchain node based on the blockchain system, and the processing process is stored on chain. The transaction request is not limited to the deal business, and may be any application business required to be carried by the blockchain or any blockchain management transaction request. The so-called miner is a blockchain node that has the permission to generate blocks in a current block generation period and is not limited to the block generation node determined based on a proof of work (POW) consensus mechanism. Block generation nodes determined based on other consensus mechanisms may also be referred to as miners. In addition, the kernel engine uses a read/write splitting design to reduce complexity, and may use independent-read components to implement read operations, enabling read operations to be individually extended. The kernel engine in the kernel engine layer may be extended and customized without invasion of framework codes or may be adjusted and customized based on lightweight codes by users according to scene requirements. That is, developers may develop the kernel engine based on the function of kernel components, without developing the kernel components separately. Based on the kernel architecture, the possibility to configure multiple types of kernel engine layers is provided for users. Specifically, a super public chain engine (xuperos engine), a super alliance chain engine (xchain engine), a user-implemented kernel engine (other engines) and the like may be configured and developed.

The kernel component layer is the specific implementation of a kernel component programming specification with the implementation of very complete built-in standard kernel components. The standard kernel components include a ledger component, a consensus component, a contract component, a network component, an encryption component, a permission component and the like for developers of the kernel engine to select. At the same time, the developers may develop kernel components suitable for scenes of the developers according to the kernel component programming specification at low cost, and seamlessly integrate the self-implemented kernel components into various kernel engines. The kernel component programming specification is a specification for abstracting kernel components. Kernel components are implemented according to the kernel component programming specification, so that a standard kernel component function interface may be provided for the kernel engine to call the kernel components, and thus the kernel engine may implement the call of the kernel components through the kernel component interface determined by a component adaptor (such as a consensus component adaptor, a contract component adaptor, a ledger component adaptor, a network component adaptor or a permission component adaptor) in the kernel engine layer, and then the processing of to-be-processed blockchain data is completed through the kernel components. The kernel component interface may also be referred to as a kernel function interface, which is a function-level interface that the kernel components provide for the kernel engine to call. No matter what kind of kernel component it is, no matter how the function of the component is implemented internally, a normalized and unified kernel component interface may be provided to facilitate the call by the kernel engine.

The basic component layer is provided with basic public components that have nothing to do with the blockchain business, such as: a basic storage, a peer-to-peer (p2p) network library, a cryptography library, a codec library and a log library.

The blockchain kernel architecture provided by the present disclosure is a brand-new, highly extendable and universal blockchain kernel framework applicable to wide-area scenes. The highly-modular design of this architecture ensures the loose coupling between modules, so that each module may be freely extended and replaced. Based on this architecture, users may develop a specific blockchain system with a very light weight according to requirements and preferences of a specific scene. According to this architecture, the difficulty of developing the blockchain system is reduced to that only part subdomain functions are extended according to scene requirements, so that the development cost of the blockchain technology is greatly reduced.

FIG. 1 is a diagram showing a method for operating a blockchain system according to an embodiment of the present disclosure. The embodiment is applicable to the case where to-be-processed blockchain data is processed by using a blockchain. The method for operating a blockchain system disclosed by the embodiment may be executed by an apparatus for operating a blockchain system. The apparatus may be implemented by software and/or hardware and configured in an electronic device having calculation and storage functions, for example, may be executed by a blockchain node. Referring to FIG. 1, the method for operating a blockchain system provided by the embodiment includes steps described below.

In step S110, to-be-processed blockchain data is acquired through a kernel engine of the blockchain system.

The kernel engine represents a core flow of the blockchain kernel. The to-be-processed blockchain data acquired by the kernel engine may be sent by the upper layer of the kernel engine, that is, the application layer, to the kernel engine after the application layer acquires the to-be-processed blockchain data from a user client, Alternatively, the to-be-processed blockchain data acquired by the kernel engine may be the to-be-processed blockchain data sent by the user client and received by the kernel engine through network components, or may be to-be-processed blockchain data formed by a blockchain system operation process, for example, a newly-generated block verification process and a block synchronization process, and received by the kernel engine through the network components.

The to-be-processed blockchain data refers to data needing to be processed by a blockchain node. Exemplarily, the to-be-processed blockchain data may further include governance data, that is, operation data for managing a network, specifically, operation data for changing a block generation node, managing a node and monitoring a network state. The to-be-processed blockchain data may also be a query request by a user for data in the blockchain and received by the kernel engine. The to-be-processed blockchain data includes at least one of: a to-be-processed blockchain transaction request, a to-be-verified block, a to-be-synchronized block or blockchain system maintenance data. The specific contents of the to-be-processed blockchain data are not limited herein, and are specifically determined according to actual situations.

In step S120, the to-be-processed blockchain data is processed through the kernel engine, a consensus component call request is generated according to a consensus component interface during a processing process of the to-be-processed blockchain data, and a corresponding consensus component is called according to the consensus component call request, where the corresponding consensus component is configured to execute a consensus mechanism between blockchain nodes.

Since the kernel engine is only a core flow of the blockchain kernel, to satisfy the requirements for processing the to-be-processed blockchain data, the kernel engine also needs to cooperate with kernel components. The processing of the to-be-processed blockchain data is completed by calling a kernel component to execute a set component function.

Specifically, the kernel engine determines a kernel component interface for processing the to-be-processed blockchain data during the processing process according to the to-be-processed blockchain data, and generates a call request corresponding to the kernel component after determining the kernel component interface. At least one kernel component is provided, and the specific number and type are not limited herein and are specifically determined according to applicable scenes of the blockchain system and the required provided functions thereof. However, it is to be noted that the kernel component includes at least a blockchain-special component such as a contract component, a ledger component or a consensus component.

As one of the most important kernel components of the blockchain system, the consensus component is responsible for implementing the consensus achievement of multi-node decentralization in the blockchain network and is the very core component of the blockchain and the premise of achieving the self-trust of the blockchain. The self-trust of the blockchain is mainly embodied in that users distributed in the blockchain do not need to trust the other party of the deal, do not need to trust a centralized organization, and only need to trust the software system under the blockchain protocol to achieve the deal.

The kernel engine calls the consensus component to execute the consensus mechanism between the blockchain nodes. Specifically, the kernel engine selects the consensus component interface among various kernel component interfaces according to the processing flow of the current to-be-processed blockchain data, generates the consensus component call request based on the consensus component interface, and executes the consensus mechanism between the blockchain nodes through the consensus component according to the consensus component corresponding to the consensus component call request. The consensus component interface refers to an interface providing a standard consensus component function for facilitating the kernel engine to call the consensus component when implementing the consensus component according to a consensus component programming specification. The consensus component call request refers to a request generated by the kernel engine based on the consensus component interface for calling the consensus component to execute the consensus mechanism between the blockchain nodes. It is to be noted that the types of parameters and the number of parameters included in the consensus component call request are determined according to a preset consensus component programming specification, and are not limited herein and are specifically determined according to actual situations. Exemplarily, the consensus component call request includes: a consensus component name, an input parameter, a requirement for returning a parameter, a callback function, etc.

In an optional embodiment, after the step in which the to-be-processed blockchain data is processed through the kernel engine, the consensus component call request is generated according to the consensus component interface during the processing process, and the corresponding consensus component is called according to the consensus component call request, where the corresponding consensus component is configured to execute the consensus mechanism between the blockchain nodes, the method further includes the step described below. The consensus component call request is executed through the corresponding consensus component, and an execution result of the consensus mechanism is acquired.

That is, after step S120, optionally, step S130 is further included: the consensus component call request is executed through the corresponding consensus component, and an execution result of the consensus mechanism is acquired.

In step S130, the consensus component call request is executed through the corresponding consensus component, and an execution result of the consensus mechanism is acquired.

After receiving the consensus component call request, the consensus component executes the consensus mechanism between the blockchain nodes according to various parameters in the consensus component call request, such as the input parameter, the callback function and the requirement for returning the parameter.

According to the technical solution of the embodiment of the present disclosure, the kernel engine cooperates with the consensus component based on the consensus component interface, so that the consensus mechanism is executed between the blockchain nodes. In the embodiment of the present disclosure, both the kernel engine and the consensus component use a modular design, and the kernel engine and the consensus component cooperate to work through the consensus component interface so as to achieve loose coupling between modules, so that both the kernel engine and the consensus component may be freely extended, and the scene applicability of the blockchain system is extended. The method for operating a blockchain system provided by the embodiment of the present disclosure reduces the difficulty of developing the blockchain system to the extent that users only need to extend the function of the consensus component or the kernel engine according to scene requirements, thus greatly reducing the development cost of the blockchain technology.

Figure 2:
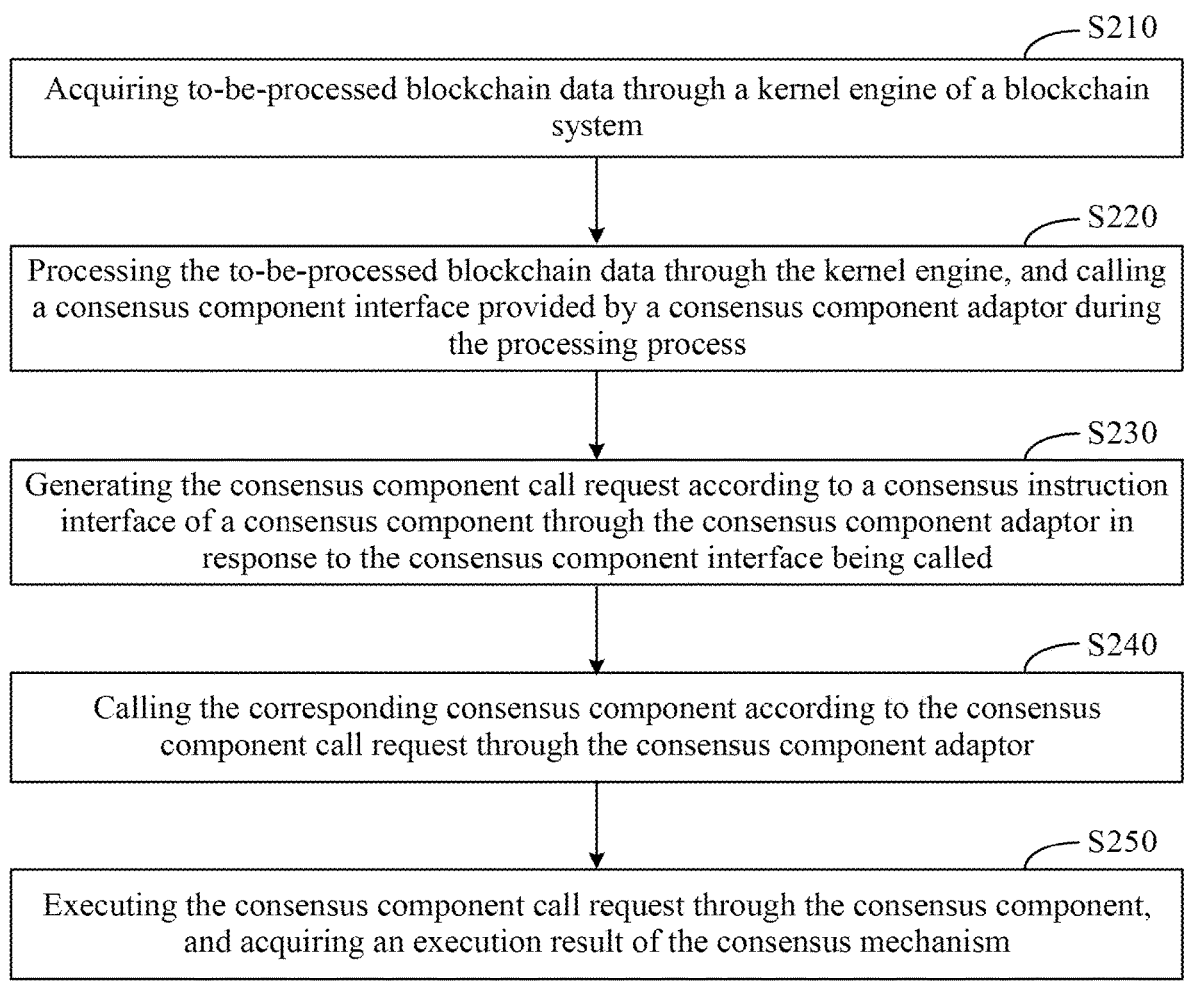
FIG. 2 is a diagram showing another method for operating a blockchain system according to an embodiment of the present disclosure.

FIG. 2 is a diagram showing another method for operating a blockchain system according to an embodiment of the present disclosure. This embodiment is an optional solution provided based on the preceding embodiment. Specifically, the step is refined in which the to-be-processed blockchain data is processed through the kernel engine, the consensus component call request is generated according to the consensus component interface during the processing process, and the corresponding consensus component is called according to the consensus component call request.

Referring to FIG. 2, the method for operating a blockchain system provided by the embodiment includes steps described below.

In step S210, to-be-processed blockchain data is acquired through a kernel engine of the blockchain system.

In step S220, the to-be-processed blockchain data is processed through the kernel engine, and a consensus component interface provided by a consensus component adaptor is called during the processing process.

After acquiring the to-be-processed blockchain data, the kernel engine processes the to-be-processed blockchain data. Specifically, in the processing process, the kernel engine determines a kernel component interface for processing the to-be-processed blockchain data from kernel component interfaces provided by the component adaptor. The process of the kernel engine processing the to-be-processed blockchain data is essentially a process of selecting a kernel component having the corresponding function according to the to-be-processed blockchain data. At least one kernel component is provided. Exemplarily, the kernel component may include at least one of a consensus component, a contract component, a ledger component or a network component. The types and number of kernel components are not limited herein, and are determined according to actual situations.

The component adaptor is configured at the kernel engine layer. The component adaptor is configured to abstract the function of each kernel component into a kernel component interface which may be directly called by the kernel engine, and the component adaptor shields the kernel engine from the implementation details of function of the kernel component.

The kernel component interface achieves the abstraction of the achievable function of the kernel component, each kernel component in the blockchain system has a corresponding kernel component interface, and one kernel component interface may correspond to multiple kernel components. The kernel component interface is provided by the component adaptor for the kernel engine, the kernel engine only needs to select the required kernel component function according to the to-be-processed blockchain data, and the kernel engine does not need to concern about the specific implementation of the kernel component function. The kernel engine may call the kernel component by calling the kernel component interface.

Optionally, in the blockchain system of the embodiment of the present disclosure, each kernel component has a corresponding component adaptor. Exemplarily, the component adaptor may include: the component adaptor such as the consensus component adaptor corresponding to the consensus component, the contract component adaptor corresponding to the contract component, the network component adaptor corresponding to the network component and the permission component adaptor corresponding to the permission component.

In the case where the kernel engine needs to execute the consensus mechanism between the blockchain nodes, the kernel engine determines the consensus component interface in the consensus component adaptor according to the to-be-processed blockchain data, and calls the consensus component by calling the consensus component interface.

The consensus component adaptor is one of the component adaptors and is configured at the kernel engine layer. The consensus component adaptor serves as a translator. The consensus component adaptor corresponds to the consensus component and is configured to abstract the function of the consensus component into a consensus component interface which may be directly called by the kernel engine, and the consensus component adaptor shields the kernel engine from the implementation details of the function of the consensus component. No matter what kind of consensus component and no matter how the component function is implemented within the consensus component, the consensus component interface abstracted by the consensus component adaptor and provided for the kernel engine is a normalized interface. In this way, a loose coupling relationship between the kernel engine and the consensus component is maintained, so that both the kernel engine and the consensus component can be freely extended and replaced.

In step S230, the consensus component call request is generated according to a consensus instruction interface of a consensus component through the consensus component adaptor in response to the consensus component interface being called.

Since the differences between the instruction system of the kernel engine and the instruction system of the consensus component may lead to the situation that the form of the kernel call instruction of the kernel engine may not be directly recognized and processed by the consensus component, the consensus instruction interface is introduced into the consensus component adaptor. When the kernel engine calls the consensus component interface, the consensus component adaptor determines the consensus instruction interface corresponding to the consensus component interface according to the called consensus component interface.

A consensus component call instruction sent by the kernel engine is processed through the consensus instruction interface, and the consensus component call instruction is converted into a form that may be directly recognized by the consensus component.

The consensus component interface is a normalized call interface which is oriented to the kernel engine and provides the consensus component interface for the kernel engine, while the consensus instruction interface is oriented to the consensus component, and converts the consensus component call instruction into a form recognizable by the corresponding consensus component in the case where the kernel engine calls the consensus component.

The kernel engine generates the consensus component call request according to the consensus component interface, and then converts the consensus component call request into an instruction-level call request which may be directly recognized by the corresponding consensus component through the consensus instruction interface in the consensus component adaptor. Optionally, the consensus component call request includes: a consensus component name, an input parameter, a requirement for returning a parameter, a callback function, etc.

To enable the consensus component to be applicable to multiple different business scenes, in the embodiment of the present disclosure, complete consensus component interfaces are configured in the consensus component adaptor for the kernel engine to select from.

In an optional embodiment, the consensus component interface includes at least one of interfaces described below.

An interface for returning whether a miner is of a specified-height block and whether a block synchronization needs to be performed (CompeteMaster(height int64)(boot, boot, error)) may be included and is configured to return to whether a native node or a specified node is a miner of a specified-height block and whether block synchronization needs to be performed.

An interface for checking whether a current block miner is legitimate (CheckMinerMatch(ctx xcontext.XContext, block cctx.BlockInterface) (boot, error)) may be included and is configured to check whether a current block miner is legitimate.

An interface for consensus processing before mining (ProcessBeforeMiner(timestamp int64)([ ]byte, [ ]byte, error)) may be included and is configured to perform corresponding processing before mining and return consensus-related information.

An interface for consensus processing during mining (CalculateBlock(block cctx.BlockInterface) error) may be included and is configured to perform corresponding processing during mining. For example, in the case where the consensus component is a PoW component, the interface for consensus processing during mining is configured to complete the proof of work.

An interface for block determination processing (ProcessConfirmBlock( )) may be included and is configured to perform corresponding processing after block determination.

An interface for consensus state acquisition (GetConsensusStatus( )(ConsensusStatus, error)) may be included and is configured to acquire related state information of the blockchain consensus.

The preceding five interfaces may be function-level consensus component interfaces or instruction-level formula instruction interfaces. Besides the preceding five interfaces, the consensus instruction interface may further include interfaces described below.

A consensus instance suspending interface (Stop( )error) may be included and is configured to suspend a consensus instance.

A consensus instance starting interface (Start( )error) may be included and is configured to start a consensus instance.

A consensus storage region analysis interface (ParseConsensusStorage(block cctx.BlockInterface) (interface { }, error)) may be included and is configured to analyze a proprietary storage region of the consensus in a block.

That is, the consensus component interface is provided for the kernel engine and is called by the kernel engine according to the component function to implement the kernel flow of the blockchain. The consensus instruction interface is an internal interface for the component adaptor to control the consensus component, may be called by the kernel engine to trigger the call of the consensus instruction interface, and may also be automatically called by the consensus adaptor according to requirements. A kernel instruction interface is automatically called, for example, according to component processing logic in the adaptor.

In an optional embodiment, the step in which the consensus component call request is generated according to the consensus instruction interface of the consensus component through the consensus component adaptor in response to the consensus component interface being called includes the step described below. A call input parameter is converted, through the consensus component adaptor, into an input parameter of the consensus component call request according to the consensus instruction interface of the consensus component in response to the consensus component interface being called to generate the consensus component call request.

The call input parameter is generated by the kernel engine based on the consensus component interface, and the differences between the instruction system of the kernel engine and the instruction system of the consensus component causes the call input parameter to be directly recognized by the consensus component in a large probability.

The input parameter of the consensus component call request refers to a call input parameter processed by the consensus instruction interface, and is an input parameter which can be directly recognized by the corresponding consensus component.

When the consensus component interface is called, the consensus component adaptor converts the input parameter of the call request of the consensus component based on the consensus instruction interface of the consensus component, and generates the consensus component call request according to the converted input parameter. The generated consensus component call request can be directly recognized by the consensus component. Exemplarily, the conversion of the call input parameter by the consensus instruction interface may achieve mapping conversion of the interface name in the call input parameter, and may also achieve the conversion of the name and type of an interface input parameter. It is to be known that the consensus component interface and the consensus instruction interface are substantially the same, but may be different in some situations. Therefore, the consensus component adaptor needs to implement functions of interface name mapping conversion and parameter validity verification and conversion.

The consensus component interface is an interface that is exposed by the adaptor and provided for the kernel engine for call. In an optional embodiment, the consensus instruction interface may also include an interface of the above names, and is an interface directly executable by the consensus component. The consensus component interface and the consensus instruction interface may have the same function, and the adaptor directly calls the consensus instruction interface according to the call of the kernel engine. Alternatively, a consensus component interface may, after conversion, call one or more consensus instruction interfaces of different interface names to complete corresponding functions.

In step S240, the corresponding consensus component is called according to the consensus component call request through the consensus component adaptor.

The consensus component adaptor calls the corresponding consensus component according to the consensus component call request obtained through the conversion of the consensus instruction interface, and thus the consensus component executes the consensus mechanism between the blockchain nodes according to the received consensus component call request.

In step S250, the consensus component call request is executed through the corresponding consensus component, and an execution result of the consensus mechanism is acquired.

After receiving the consensus component call request, the consensus component executes the consensus mechanism between the blockchain nodes according to various parameters in the consensus component call request, such as the input parameter, the callback function and the requirement for returning the parameter.

According to the technical solution of the embodiment of the present disclosure, the kernel engine cooperates with the consensus component, so that the consensus mechanism is executed between the blockchain nodes. In the present disclosure, both the kernel engine and the consensus component use a modular design, and the two cooperate to work through the consensus component adaptor so as to achieve loose coupling between modules. The consensus component adaptor provides the consensus component interface for the kernel engine to enable the kernel engine to select a consensus component according to requirements. On the other hand, the consensus component adaptor converts, through the consensus instruction interface, a consensus component call instruction of the kernel engine into a form that can be recognized by the consensus component. The consensus component adaptor is introduced, so that both the kernel engine and the consensus component can be freely extended, and thereby the scene applicability of the blockchain system is extended. The method for operating a blockchain system provided by the present disclosure reduces the difficulty of developing the blockchain system to the extent that users only need to extend the function of the consensus component or the kernel engine according to scene requirements, thus greatly reducing the development cost of the blockchain technology.

Figure 3:
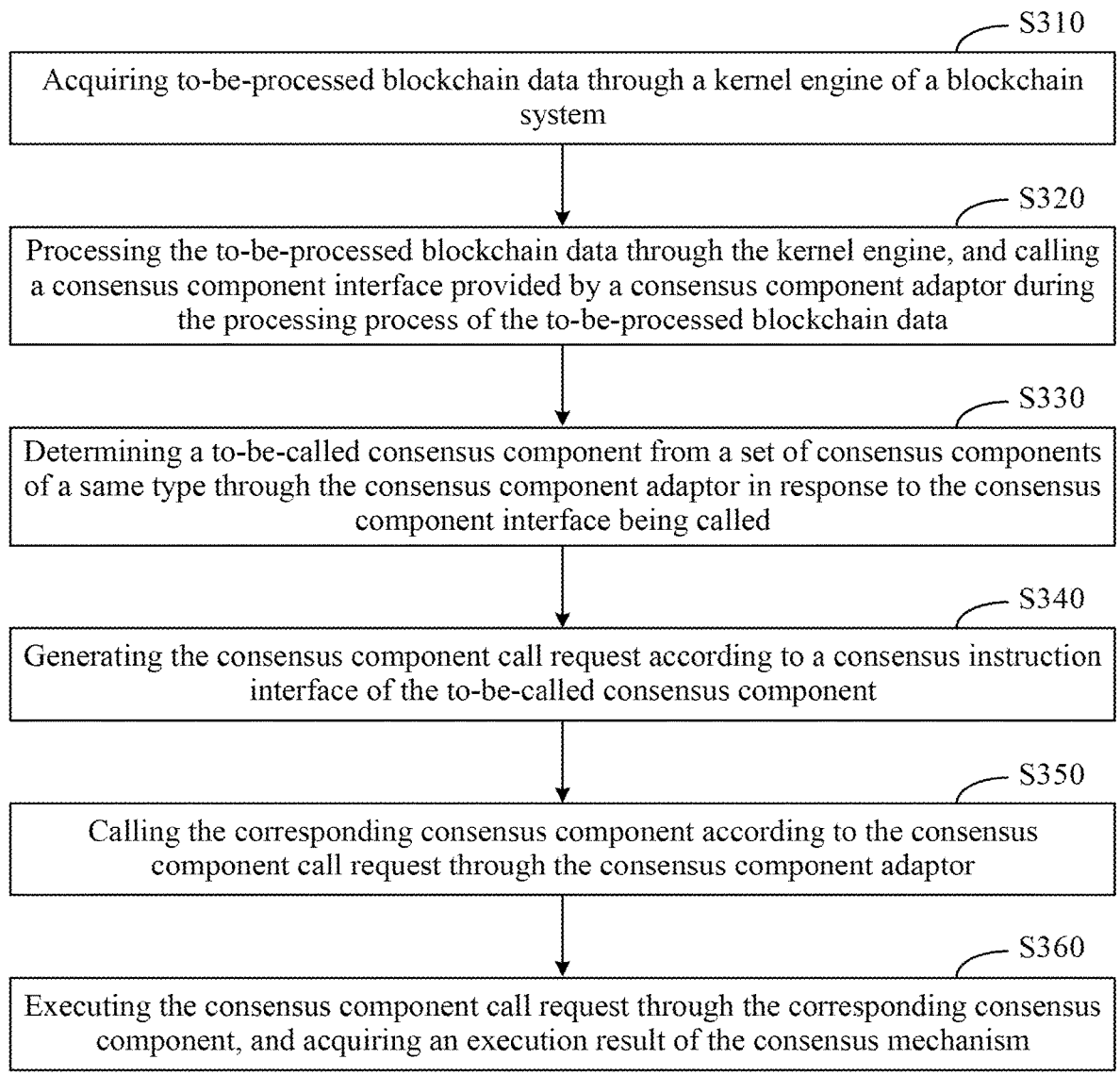
FIG. 3 is a diagram showing another method for operating a blockchain system according to an embodiment of the present disclosure.

FIG. 3 is a diagram showing another method for operating a blockchain system according to an embodiment of the present disclosure. This embodiment is an optional solution provided based on the preceding embodiment. Specifically, the step is refined in which the consensus component call request is generated according to the consensus instruction interface of the consensus component through the consensus component adaptor in response to the consensus component interface being called.

Referring to FIG. 3, the method for operating a blockchain system provided by the embodiment includes steps described below.

In step S310, to-be-processed blockchain data is acquired through a kernel engine of the blockchain system.

In step S320, the to-be-processed blockchain data is processed through the kernel engine, and a consensus component interface provided by a consensus component adaptor is called during the processing process.

In step S330, a to-be-called consensus component is determined from a set of consensus components of a same type through the consensus component adaptor in response to the consensus component interface being called.

The requirements for consensus components are different in different landing scenes, some scenes require Byzantine fault tolerance (BFT) consensus, some scenes require deterministic consensus, and some scenes require consensus supporting ultra large scale nodes. Optionally, the consensus components are further classified according to the differences in the application scenes of the consensus components, that is, multiple consensus components applicable to different scenes may be included in the blockchain system, and these consensus components all have the function of executing the consensus mechanism between the blockchain nodes. Optionally, the consensus components may include a single component, an xpos component, an xpoa component and a pow component.

When the kernel engine calls the consensus component through the consensus component call interface, the consensus component adaptor also needs to determine a to-be-called consensus component from a set of consensus components of a same type according to specific user requirements, that is, needs to select a consensus component belonging to a subtype from consensus components belonging to a broad type of functions. Specifically, the user requirements are determined by the user according to the application scene and business requirements of the blockchain system, and are registered in the consensus component adaptor in a blockchain initialization stage.

In step S340, the consensus component call request is generated according to a consensus instruction interface of the to-be-called consensus component.

The consensus instruction interface converts a call input parameter provided by the kernel engine based on the consensus component interface into an input parameter which can be directly recognized by the consensus component, and generates the consensus component call request based on the converted input parameter.

In step S350, the corresponding consensus component is called according to the consensus component call request through the consensus component adaptor.

In step S360, the consensus component call request is executed through the corresponding consensus component, and an execution result of the consensus mechanism is acquired.

According to the technical solution of the embodiment of the present disclosure, the kernel engine cooperates with the consensus component, so that the consensus mechanism is executed between the blockchain nodes. In the present disclosure, both the kernel engine and the consensus component use a modular design, and the kernel engine and the consensus component cooperate to work through the consensus component adaptor so as to achieve loose coupling between modules. The consensus component adaptor is introduced, so that both the kernel engine and the consensus component can be freely extended. On the other hand, when the consensus component interface is called, the to-be-called consensus component is determined from the set of consensus components of a same type through the consensus component adaptor, and the consensus component call request is generated according to a kernel instruction interface of the to-be-called consensus component, so that users' personalized requirements are satisfied, and the application scene of the blockchain system is extended. The method for operating a blockchain system provided by the present disclosure reduces the difficulty of developing the blockchain system to the extent that users only need to extend the function of the consensus component or the kernel engine according to scene requirements, thus greatly reducing the development cost of the blockchain technology.

Figure 4:
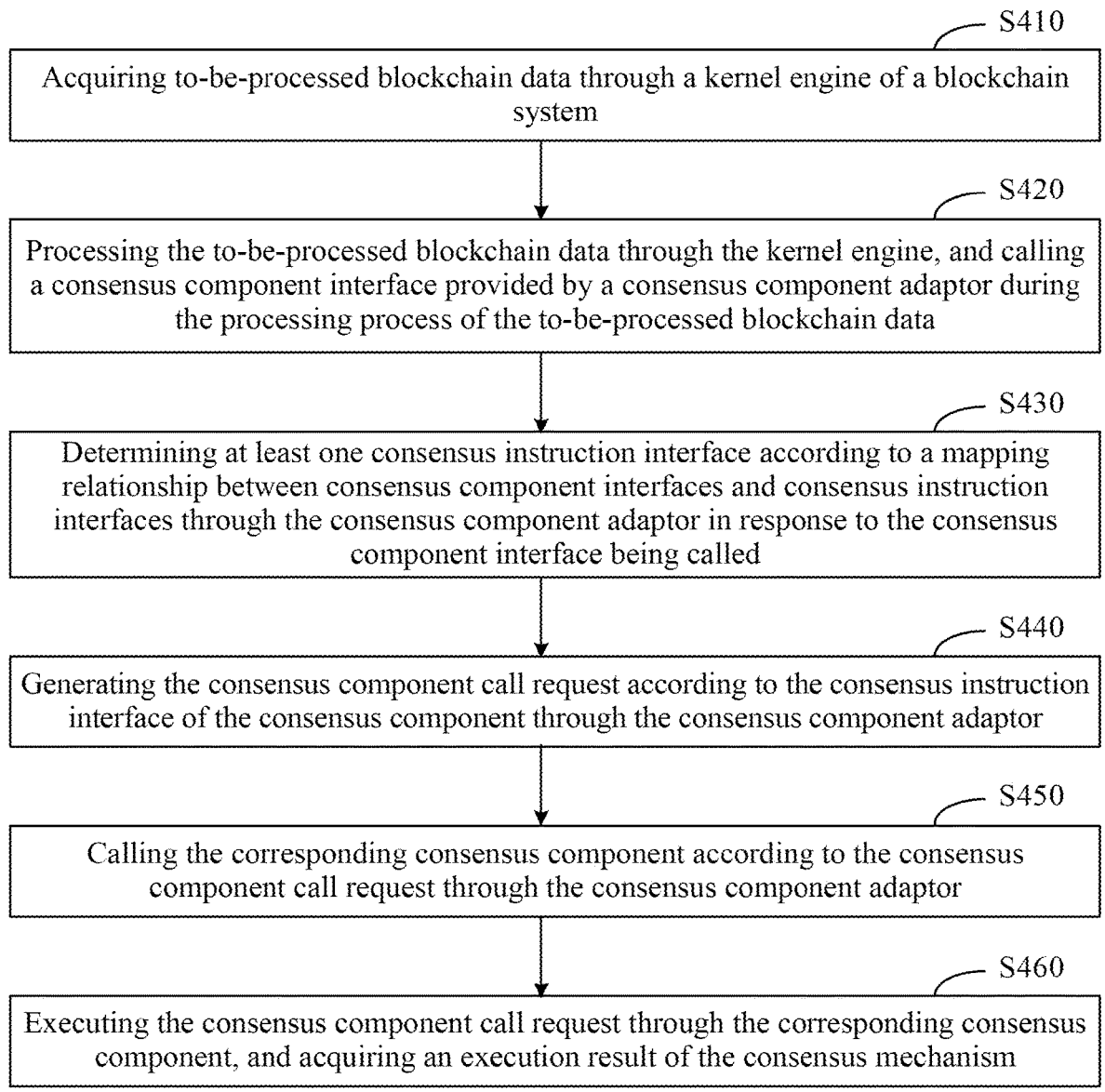
FIG. 4 is a diagram showing another method for operating a blockchain system according to an embodiment of the present disclosure.

FIG. 4 is a diagram showing another method for operating a blockchain system according to an embodiment of the present disclosure. This embodiment is an optional solution provided based on the preceding embodiment. Specifically, the step is refined in which the consensus component call request is generated according to the consensus instruction interface of the consensus component through the consensus component adaptor in response to the consensus component interface being called.

Referring to FIG. 4, the method for operating a blockchain system provided by the embodiment includes steps described below.

In step S410, to-be-processed blockchain data is acquired through a kernel engine of the blockchain system.

In step S420, the to-be-processed blockchain data is processed through the kernel engine, and a consensus component interface provided by a consensus component adaptor is called during the processing process.

In step S430, at least one consensus instruction interface is determined according to a mapping relationship between consensus component interfaces and consensus instruction interfaces through the consensus component adaptor in response to the consensus component interface being called.

The mapping relationship between consensus component interfaces and consensus instruction interfaces is registered in the consensus component adaptor in an initialization stage of the blockchain system.

When the consensus component interface is called, according to the mapping relationship between consensus component interfaces and consensus instruction interfaces, a kernel instruction interface corresponding to the consensus component interface may be determined in the consensus instruction interface. A consensus component interface may correspond to multiple consensus instruction interfaces.

In step S440, the consensus component call request is generated according to the at least one consensus instruction interface of the consensus component through the consensus component adaptor.

The consensus component call request refers to a call request that can be recognized by the consensus component and directly executed without secondary conversion. The consensus component call request is generated according to the kernel instruction interface of the consensus component through the consensus component adaptor.

In step S450, the corresponding consensus component is called according to the consensus component call request through the consensus component adaptor.

In step S460, the consensus component call request is executed through the corresponding consensus component, and an execution result of the consensus mechanism is acquired.

According to the technical solution of the embodiment of the present disclosure, the kernel engine cooperates with the consensus component based on the consensus component interface, so that the consensus mechanism is executed between the blockchain nodes. In the present disclosure, both the kernel engine and the consensus component use a modular design, and the two cooperate to work through the consensus component adaptor so as to achieve loose coupling between modules. The consensus component adaptor provides the consensus component interface for the kernel engine to enable the kernel engine to select a consensus component according to requirements. On the other hand, when the consensus component interface is called, the consensus component adaptor determines the consensus instruction interface according to the mapping relationship between consensus component interfaces and consensus instruction interfaces, and converts, through the consensus instruction interface, a consensus component call instruction of the kernel engine into a form that can be recognized by the consensus component. The consensus component adaptor is introduced, so that both the kernel engine and the consensus component can be freely extended, and thereby the scene applicability of the blockchain system is extended. The method for operating a blockchain system provided by the present disclosure reduces the difficulty of developing the blockchain system to the extent that users only need to extend the function of the consensus component or the kernel engine according to scene requirements, thus greatly reducing the development cost of the blockchain technology.

Figure 5:
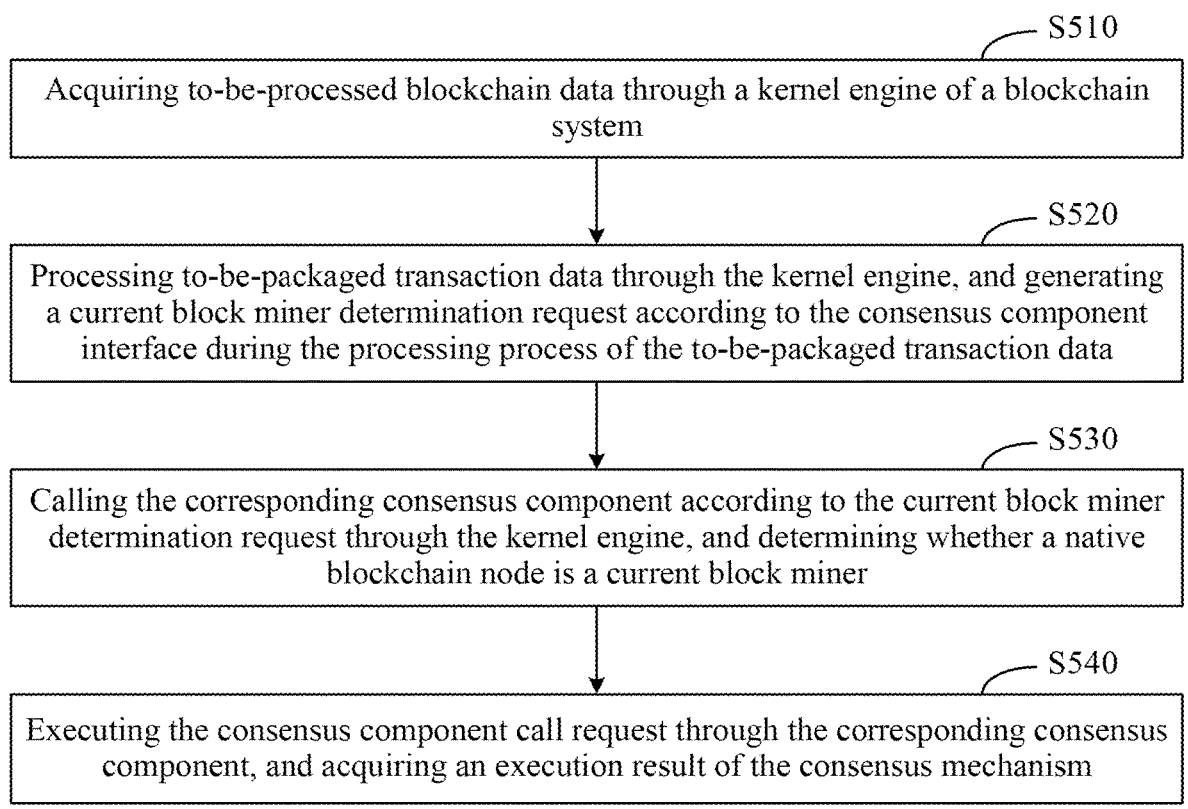
FIG. 5 is a diagram showing another method for operating a blockchain system according to an embodiment of the present disclosure.

FIG. 5 is a diagram showing another method for operating a blockchain system according to an embodiment of the present disclosure. This embodiment is an optional solution provided based on the preceding embodiment. Specifically, the step is refined in which the to-be-processed blockchain data is processed through the kernel engine, the consensus component call request is generated according to the consensus component interface during the processing process, and the corresponding consensus component is called according to the consensus component call request.

Referring to FIG. 5, the method for operating a blockchain system provided by the embodiment includes steps described below.

In step S510, to-be-processed blockchain data is acquired through a kernel engine of the blockchain system.

The to-be-processed blockchain data may be a to-be-packaged block received and transmitted by a network component to the kernel engine. The to-be-packaged block is a new block needing to be packaged in the blockchain network.

In general, after a new block is generated by a block generation node, that is, a miner, the packaging flow of the block is entered, and other blockchain nodes except the miner in the blockchain network need to verify the validity of a to-be-verified block. That is to say, whether a native node is a miner will affect the processing flow of the to-be-verified block by the native node. Only in the case where the native node is the current miner, the native node directly enters the block packaging flow after generating the block. Therefore, in the case where the kernel engine receives the to-be-packaged block transmitted by the network component, the current block miner is determined through the consensus component, and thereby the next processing flow of the native node is determined.

In step S520, to-be-packaged transaction data is processed through the kernel engine, and a current block miner determination request is generated according to the consensus component interface during the processing process.

The to-be-packaged transaction data refers to a to-be-packaged block needing to be packaged. The kernel engine processes the to-be-packaged transaction data. Specifically, the kernel engine determines the consensus component interface in the kernel component interface according to the block generation flow and the to-be-packaged transaction data, and the kernel engine generates the current block miner determination request based on the consensus component interface. The current block miner determination request is a request generated by the kernel engine for querying the current block miner, and the current block miner determination request includes a consensus component name, an input parameter, a callback function and a requirement for returning a parameter.

In step S530, the corresponding consensus component is called according to the current block miner determination request through the kernel engine, and whether a native blockchain node is a current block miner is determined.

The kernel engine calls the corresponding consensus component according to the current block miner determination request, and determines whether the native blockchain node is the current block miner through the consensus component.

In step S540, the consensus component call request is executed through the corresponding consensus component, and an execution result of the consensus mechanism is acquired.

After receiving the consensus component call request, the consensus component executes the consensus mechanism between the blockchain nodes according to various parameters in the consensus call request, such as the input parameter, the callback function and the requirement for returning the parameter, acquires the execution result of the consensus mechanism, and feeds back the execution result of the consensus mechanism to the kernel engine. The execution result of the consensus mechanism is a current block miner determination result.

According to the technical solution of the embodiment of the present disclosure, the kernel engine cooperates with the consensus component based on the consensus component interface, so that the processing flow is implemented that before the block is packaged, whether the native blockchain node is the current block miner is determined, and the native node is determined. In the embodiment of the present disclosure, both the kernel engine and the consensus component use a modular design, and the two cooperate to work through the consensus component interface so as to achieve loose coupling between modules, so that both the kernel engine and the consensus component can be freely extended, and thereby the scene applicability of the blockchain system is extended. The method for operating a blockchain system provided by the embodiment of the present disclosure reduces the difficulty of developing the blockchain system to the extent that users only need to extend the function of the network component or the kernel engine according to scene requirements, thus greatly reducing the development cost of the blockchain technology.

Figure 6:
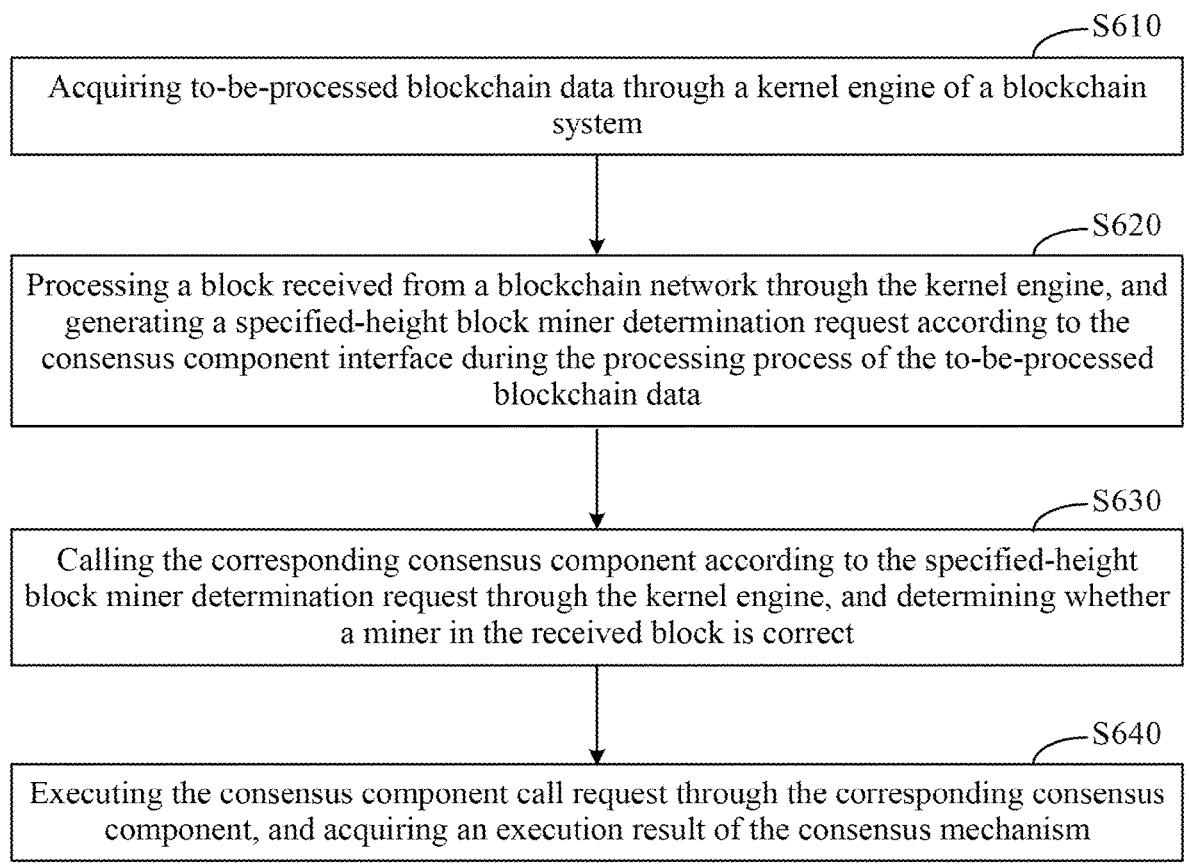
FIG. 6 is a diagram showing another method for operating a blockchain system according to an embodiment of the present disclosure.

FIG. 6 is a diagram showing another method for operating a blockchain system according to an embodiment of the present disclosure. This embodiment is an optional solution provided based on the preceding embodiment. Specifically, the step is refined in which the to-be-processed blockchain data is processed through the kernel engine, the consensus component call request is generated according to the consensus component interface during the processing process, and the corresponding consensus component is called according to the consensus component call request.

Referring to FIG. 6, the method for operating a blockchain system provided by the embodiment includes steps described below.

In step S610, to-be-processed blockchain data is acquired through a kernel engine of the blockchain system.

The to-be-processed blockchain data may be a to-be-verified block received and transmitted by a network component to the kernel engine. The to-be-verified block is a new block whose validity needs to be verified in the blockchain network.

In general, after a new block is generated by a block generation node, that is, a miner, the packaging flow of the block is entered, and other blockchain nodes except the miner in the blockchain network need to verify the validity of the to-be-verified block. That is to say, in the case where a native node is not the block generation node, the validity of the to-be-verified block needs to be verified.

In step S620, a block received from a blockchain network is processed through the kernel engine, and a specified-height block miner determination request is generated according to the consensus component interface during the processing process.

The block received by the kernel engine from the blockchain network is the block needing to be verified by the native node. The kernel engine processes the block, and specifically, the kernel engine verifies the validity of the block, including verifying the identity of the miner generating the block.

The kernel engine determines the consensus component interface in the kernel component interface according to the block verification flow and the received block, and the specified-height block miner determination request is generated by the kernel engine based on the consensus component interface. The specified-height block miner determination request is a request generated by the kernel engine for calculating the height of the miner generating the to-be-verified block. The specified-height block miner determination request includes a consensus component name, an input parameter, a callback function and a requirement for returning a parameter.

Specifically, the kernel engine determines the consensus component interface in the kernel component interface as the CompeteMaster(height int64)(boot, boot, error) interface. The kernel engine calls the consensus component through the interface, and the consensus component completes the calculation of the height of the miner.

In step S630, the corresponding consensus component is called according to the specified-height block miner determination request through the kernel engine, and whether a miner in the received block is correct is determined.

The kernel engine calls the corresponding consensus component according to the miner determination request, determines whether the miner generating the to-be-verified block is the miner of the specified-height block through the consensus component, and then determines whether the miner in the received block is correct.

In step S640, the consensus component call request is executed through the corresponding consensus component, and an execution result of the consensus mechanism is acquired.

After receiving the consensus component call request, the consensus component executes the consensus mechanism between the blockchain nodes according to various parameters in the consensus call request, such as the input parameter, the callback function and the requirement for returning the parameter, acquires the execution result of the consensus mechanism, and feeds back the execution result of the consensus mechanism to the kernel engine. The execution result of the consensus mechanism is a specified-height block miner determination result.

In an optional embodiment, the starting process of the consensus component in the blockchain system is described. Specifically, in response to the blockchain nodes being started, the consensus instruction interface of the consensus component and a consensus component configuration parameter are registered in the consensus component adaptor. The consensus component is started and instantiated through the kernel engine.

In the starting process of the blockchain node, the consensus instruction interface of the consensus component and the consensus component configuration parameter are registered in the consensus component adaptor. The consensus instruction interface is oriented to the consensus component, and converts a consensus component call instruction into a form recognizable by the corresponding consensus component in the case where the kernel engine calls the consensus component. The consensus component configuration parameter is used for configuring a basic parameter for calling the consensus component, and the consensus component configuration parameter includes type selection information of the consensus component. Optionally, consensus instruction interfaces of all consensus components are registered in the consensus component adaptor. Specifically, the specific implementation logic of the consensus components, that is, the component driver, may be registered in the consensus adaptor, so that the registration of the consensus component interfaces is achieved through the component driver.

The kernel engine starts and instantiates the consensus components, and allocates computing resources and memory resources to the consensus components so that the consensus components can implement the function of executing the consensus mechanism between the blockchain nodes.

In the embodiment of the present disclosure, the consensus components use a modular design, and the consensus components are all registered in the blockchain system in an initialization registration manner by using init process during a starting stage of the blockchain, so that the consensus component registration can be automatically completed when the application layer imports a consensus component package into the blockchain. Developers only need to pay attention to the access specification of the consensus components and implement the interface constrained by the specification. Component driver codes may be freely stored without code intrusion.

According to the technical solution of the embodiment of the present disclosure, the kernel engine cooperates with the consensus component based on the consensus component interface, so that the verification of the identity of the miner generating the to-be-verified block is achieved. In the embodiment of the present disclosure, both the kernel engine and the consensus component use a modular design, and the two cooperate to work through the consensus component interface so as to achieve loose coupling between modules, so that both the kernel engine and the consensus component can be freely extended, and thereby the scene applicability of the blockchain system is extended. The method for operating a blockchain system provided by the embodiment of the present disclosure reduces the difficulty of developing the blockchain system to the extent that users only need to extend the function of the consensus component or the kernel engine according to scene requirements, thus greatly reducing the development cost of the blockchain technology.

Figure 7:
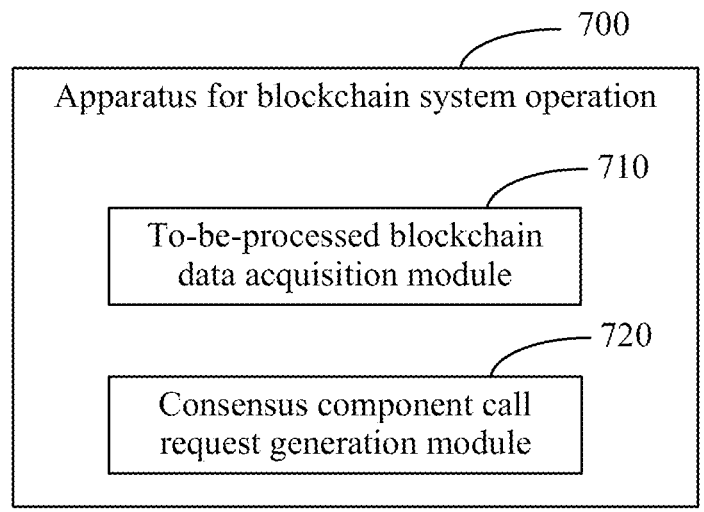
FIG. 7 is a diagram showing an apparatus for operating a blockchain system according to an embodiment of the present disclosure.

FIG. 7 is a diagram showing an apparatus for operating a blockchain system according to an embodiment of the present disclosure. Referring to FIG. 7, the embodiment of the present disclosure discloses an apparatus 700 for operating a blockchain system. The apparatus 700 may include: a to-be-processed blockchain data acquisition module 710 and a consensus component call request generation module 720.

The to-be-processed blockchain data acquisition module 710 is configured to acquire, through a kernel engine of the blockchain system, to-be-processed blockchain data.

The consensus component call request generation module 720 is configured to process, through the kernel engine, the to-be-processed blockchain data, generate a consensus component call request according to a consensus component interface during a processing process of the to-be-processed blockchain data, and call a corresponding consensus component according to the consensus component call request, where the corresponding consensus component is configured to execute a consensus mechanism between blockchain nodes.

According to the technical solution of the embodiment of the present disclosure, the kernel engine cooperates with the consensus component based on the consensus component interface, so that the consensus mechanism is executed between the blockchain nodes. In the embodiment of the present disclosure, both the kernel engine and the consensus component use a modular design, and the two cooperate to work through the consensus component interface so as to achieve loose coupling between modules, so that both the kernel engine and the consensus component can be freely extended, and thereby the scene applicability of the blockchain system is extended. The method for operating a blockchain system provided by the embodiment of the present disclosure reduces the difficulty of developing the blockchain system to the extent that users only need to extend the function of the consensus component or the kernel engine according to scene requirements, thus greatly reducing the development cost of the blockchain technology.

Optionally, the apparatus further includes a consensus mechanism execution result acquisition module, which is configured to after the step in which the to-be-processed blockchain data is processed through the kernel engine, the consensus component call request is generated according to the consensus component interface during the processing process, and the corresponding consensus component is called according to the consensus component call request, where the corresponding consensus component is configured to execute the consensus mechanism between the blockchain nodes, execute, through the corresponding consensus component, the consensus component call request, and acquire an execution result of the consensus mechanism.

Optionally, the consensus component call request generation module 720 includes a consensus component interface call submodule, a consensus component call request generation submodule and a consensus component call submodule. The consensus component interface call submodule is configured to process, through the kernel engine, the to-be-processed blockchain data, and call a consensus component interface provided by a consensus component adaptor during the processing process. The consensus component call request generation submodule is configured to generate, through the consensus component adaptor, the consensus component call request according to a consensus instruction interface of a consensus component in response to the consensus component interface being called. The consensus component call submodule is configured to call, through the consensus component adaptor, the corresponding consensus component according to the consensus component call request.

Optionally, the consensus component call request generation submodule includes a to-be-called consensus component determination unit and a consensus component call request generation unit. The to-be-called consensus component determination unit is configured to determine, through the consensus component adaptor, a to-be-called consensus component from a set of consensus components of a same type in response to the consensus component interface being called. The consensus component call request generation unit is configured to generate the consensus component call request according to a consensus instruction interface of the to-be-called consensus component.

Optionally, the consensus component call request generation submodule is specifically configured to convert, through the consensus component adaptor, a call input parameter into an input parameter of the consensus component call request according to the consensus instruction interface of the consensus component in response to the consensus component interface being called to generate the consensus component call request.

Optionally, the consensus component call request generation submodule includes a consensus instruction interface determination unit and a consensus component call request generation unit. The consensus instruction interface determination unit is configured to determine, through the consensus component adaptor, at least one consensus instruction interface according to a mapping relationship between consensus component interfaces and consensus instruction interfaces in response to the consensus component interface being called. The consensus component call request generation unit is configured to generate, through the consensus component adaptor, the consensus component call request according to the at least one consensus instruction interface of the consensus component.

Optionally, the consensus component interface or the consensus instruction interface includes at least one of: an interface for returning whether a miner is of a specified-height block and whether a block synchronization needs to be performed, an interface for checking whether a current block miner is legitimate, an interface for consensus processing before mining, an interface for consensus processing during mining, an interface for block determination processing or an interface for consensus state acquisition.

The consensus instruction interface further includes at least one of: a consensus instance suspending interface, a consensus instance starting interface or a consensus storage region analysis interface.

Optionally, the consensus component call request generation module 720 includes a current block miner determination request generation submodule and a current block miner determination submodule. The current block miner determination request generation submodule is configured to process, through the kernel engine, to-be-packaged transaction data, and generate a current block miner determination request according to the consensus component interface during the processing process.

The current block miner determination submodule is configured to call, through the kernel engine, the corresponding consensus component according to the current block miner determination request, and determine whether a native blockchain node is a current block miner.

Optionally, the consensus component call request generation module 720 includes a specified-height block miner determination request generation submodule and a miner correctness determination submodule. The specified-height block miner determination request generation submodule is configured to process, through the kernel engine, a block received from a blockchain network, and generate a specified-height block miner determination request according to the consensus component interface during the processing process. The miner correctness determination submodule is configured to call, through the kernel engine, the corresponding consensus component according to the specified-height block miner determination request, and determine whether a miner in the received block is correct.

Optionally, the apparatus 700 further includes a consensus component registration module and a consensus component instantiation module. The consensus component registration module is configured to in response to the blockchain nodes being started, register the consensus instruction interface of the consensus component and a consensus component configuration parameter in the consensus component adaptor. The consensus component instantiation module is configured to start and instantiate, through the kernel engine, the consensus component.

The apparatus for operating a blockchain system provided by the embodiment of the present disclosure may execute the method for operating a blockchain system provided by any embodiment of the present disclosure, and has corresponding functional modules and beneficial effects for executing the method for operating a blockchain system.

According to the embodiments of the present disclosure, the present disclosure further provides an electronic device, a readable storage medium and a computer program product.

Figure 8:
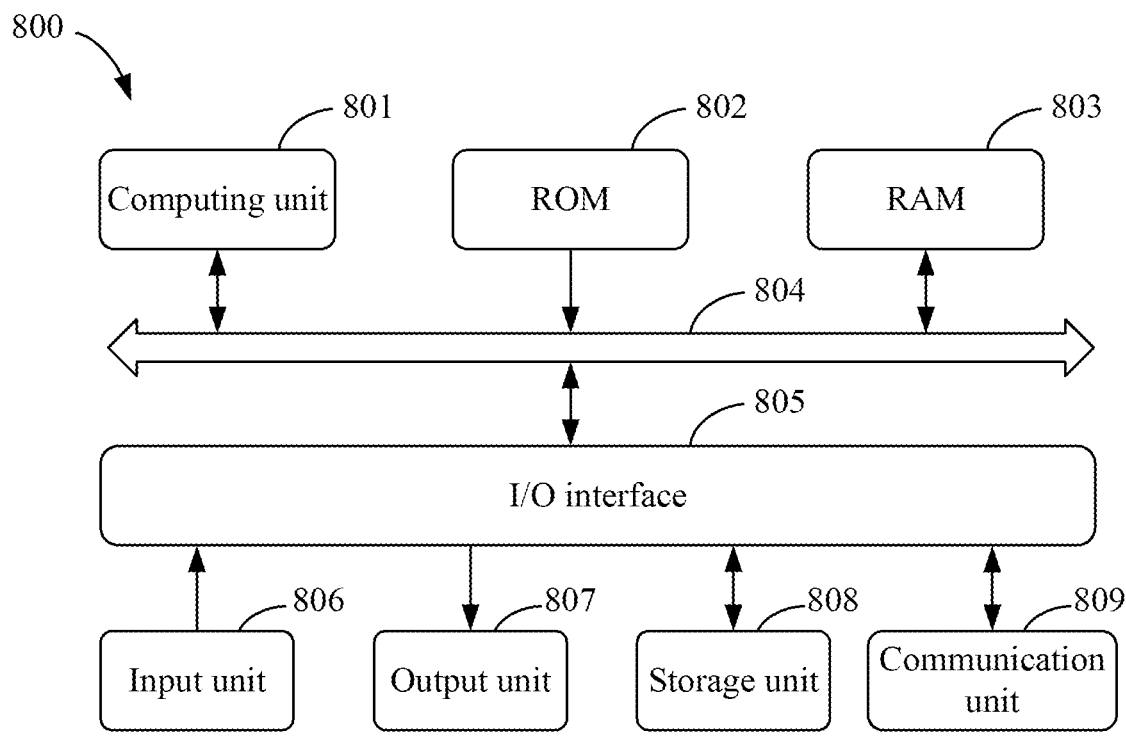
FIG. 8 is a block diagram of an electronic device for implementing a method for operating a blockchain system according to an embodiment of the present disclosure.

FIG. 8 is a block diagram of an exemplary electronic device 800 that may be configured to implement the embodiments of the present disclosure. Electronic devices are intended to represent various forms of digital computers, for example, laptop computers, desktop computers, worktables, personal digital assistants, servers, blade servers, mainframe computers and other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein.

As shown in FIG. 8, the device 800 includes a computing unit 801. The computing unit 801 may perform various types of appropriate operations and processing based on a computer program stored in a read-only memory (ROM) 802 or a computer program loaded from a storage unit 808 to a random-access memory (RAM) 803. Various programs and data required for operations of the device 800 may also be stored in the RAM 803. The computing unit 801, the ROM 802 and the RAM 803 are connected to each other through a bus 804. An input/output (I/O) interface 805 is also connected to the bus 804.

Multiple components in the device 800 are connected to the I/O interface 805. The components include an input unit 806 such as a keyboard and a mouse, an output unit 807 such as various types of displays and speakers, the storage unit 808 such as a magnetic disk and an optical disk, and a communication unit 809 such as a network card, a modem and a wireless communication transceiver. The communication unit 809 allows the device 800 to exchange information/data with other devices over a computer network such as the Internet and/or various telecommunications networks.

The computing unit 801 may be various general-purpose and/or special-purpose processing components having processing and computing capabilities. Examples of the computing unit 801 include, but are not limited to, a central processing unit (CPU), a graphics processing unit (GPU), a special-purpose artificial intelligence (AI) computing chip, a computing unit executing machine learning models and algorithms, a digital signal processor (DSP) and any appropriate processor, controller and microcontroller. The computing unit 801 executes various preceding methods and processing, such as the method for operating a blockchain system. For example, in some embodiments, the method for operating a blockchain system may be implemented as a computer software program tangibly contained in a machine-readable medium such as the storage unit 808. In some embodiments, part or all of the computer program may be loaded and/or installed on the device 800 via the ROM 802 and/or the communication unit 809. When the computer program is loaded to the RAM 803 and executed by the computing unit 801, one or more steps of the preceding method for operating a blockchain system may be executed. Alternatively, in other embodiments, the computing unit 801 may be configured, in any other suitable manner (for example, by means of firmware), to execute the method for operating a blockchain system.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementing the methods of the present disclosure may be compiled in any combination of one or more programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or in conjunction with a system, apparatus or device that executes instructions. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disk read-only memory (CD-ROM), an optical memory device, a magnetic memory device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. The clients and servers are usually far away from each other and generally interact through the communication network. The relationship between the clients and the servers arises by virtue of computer programs running on respective computers and having a client-server relationship to each other. The server may be a cloud server, also referred to as a cloud computing server or a cloud host. As a host product in a cloud computing service system, the server solves the defects of difficult management and weak business scalability in conventional physical hosts and VPS services.

It is to be understood that various forms of the preceding flows may be used, with steps reordered, added or removed. For example, the steps described in the present disclosure may be executed in parallel, in sequence or in a different order as long as the desired result of the technical solutions disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. A method for operating a blockchain system comprising a kernel architecture comprising a kernel engine layer and a kernel component layer, comprising:

acquiring, through a kernel engine of the kernel engine layer, to-be-processed blockchain data, wherein the kernel engine of the kernel engine layer is generated by developing a function of a consensus component of the kernel component layer;

calling, through the kernel engine of the kernel engine layer, a consensus component interface provided by a consensus component adaptor of the kernel engine layer according to the to-be-processed blockchain data, wherein the consensus component adaptor of the kernel engine layer is configured to abstract, according to a kernel component programming specification, the function of the consensus component of the kernel component layer into the consensus component interface which is directly called by the kernel engine of the kernel engine layer;

generating, through the consensus component adaptor of the kernel engine layer, a consensus component call request according to a consensus instruction interface of the consensus component of the kernel component layer provided by the consensus component adaptor of the kernel engine layer in response to the consensus component interface being called, wherein the consensus instruction interface is configured to convert a call input parameter into an input parameter of the consensus component call request in a form recognizable by the consensus component of the kernel component layer in the case where the kernel engine of the kernel engine layer calls the consensus component interface; and calling, through the consensus component adaptor of the kernel engine layer, the consensus component of the kernel component layer according to the consensus component call request to process the to-be-processed blockchain data, wherein the consensus component of the kernel component layer is implemented according to the kernel component programming specification and configured to execute a consensus mechanism between blockchain nodes;

wherein types of parameters and a number of the parameters comprised in the consensus component call request are determined according to a preset consensus component programming specification.

2. The method according to claim 1, after calling, through the consensus component adaptor of the kernel engine layer, the consensus component of the kernel component layer according to the consensus component call request to process the to-be-processed blockchain data, further comprising:

executing, through the consensus component of the kernel component layer, the consensus component call request, and acquiring an execution result of the consensus mechanism.

3. The method according to claim 1, wherein the generating, through the consensus component adaptor of the kernel engine layer, the consensus component call request according to the consensus instruction interface of the consensus component of the kernel component layer provided by the consensus component adaptor of the kernel engine layer in response to the consensus component interface being called comprises:

determining, through the consensus component adaptor of the kernel engine layer, a to-be-called consensus component by performing a subtype selection from a set of consensus components of a same type of functions of the kernel component layer according to user requirements in response to the consensus component interface being called, wherein the user requirements are determined by a user according to an application scene and business requirements of the blockchain system, and are registered in the consensus component adaptor of the kernel engine layer in a blockchain initialization stage; and generating the consensus component call request according to a consensus instruction interface of the to-be-called consensus component provided by the consensus component adaptor of the kernel engine layer.

4. The method according to claim 1, wherein the generating, through the consensus component adaptor of the kernel engine layer, the consensus component call request according to the consensus instruction interface of the consensus component of the kernel component layer provided by the consensus component adaptor of the kernel engine layer in response to the consensus component interface being called comprises:

converting, through the consensus component adaptor of the kernel engine layer, the call input parameter into the input parameter of the consensus component call request in the form recognizable by the consensus component of the kernel component layer according to the consensus instruction interface of the consensus component of the kernel component layer provided by the consensus component adaptor of the kernel engine layer in response to the consensus component interface being called to generate the consensus component call request.

5. The method according to claim 1, wherein the generating, through the consensus component adaptor of the kernel engine layer, the consensus component call request according to the consensus instruction interface of the consensus component of the kernel component layer provided by the consensus component adaptor of the kernel engine layer in response to the consensus component interface being called comprises:

determining, through the consensus component adaptor of the kernel engine layer, at least one consensus instruction interface provided by the consensus component adaptor of the kernel engine layer according to a mapping relationship between consensus component interfaces and consensus instruction interfaces in response to the consensus component interface being called; and generating, through the consensus component adaptor of the kernel engine layer, the consensus component call request according to the at least one consensus instruction interface of the consensus component of the kernel component layer.

6. The method according to claim 1, wherein the consensus component interface or the consensus instruction interface comprises at least one of:

an interface for returning whether a miner is of a specified-height block and whether a block synchronization needs to be performed;

an interface for checking whether a current block miner is legitimate;

an interface for consensus processing before mining;

an interface for consensus processing during mining;

an interface for block determination processing; or an interface for consensus state acquisition; and wherein the consensus instruction interface further comprises at least one of:

a consensus instance suspending interface;

a consensus instance starting interface; or a consensus storage region analysis interface.

7. The method according to claim 2, wherein the to-be-processed blockchain data comprises to-be-packaged transaction data, and the consensus component call request comprises a current block miner determination request;

wherein calling, through the consensus component adaptor of the kernel engine layer, the consensus component of the kernel component layer according to the consensus component call request to process the to-be-processed blockchain data comprises:

calling, through the consensus component adaptor of the kernel engine layer, the consensus component of the kernel component layer according to the current block miner determination request, and determining whether a native blockchain node is a current block miner.

8. The method according to claim 2, wherein the to-be-processed blockchain data comprises a block received from a blockchain network, and the consensus component call request comprises a a specified-height block miner determination request;

wherein calling, through the consensus component adaptor of the kernel engine layer, the consensus component of the kernel component layer according to the consensus component call request to process the to-be-processed blockchain data comprises:

calling, through the consensus component adaptor of the kernel engine layer, the consensus component of the kernel component layer according to the specified-height block miner determination request, and determining whether a miner in the received block is correct.

9. The method according to claim 1, further comprising:

in response to the blockchain nodes being started, registering the consensus instruction interface of the consensus component of the kernel component layer and a consensus component configuration parameter in the consensus component adaptor of the kernel engine layer; and starting and instantiating, through the kernel engine of the kernel engine layer, the consensus component.

10. An apparatus for operating a blockchain system comprising a kernel architecture comprising a kernel engine layer and a kernel component layer, comprising a processor and a memory, wherein the memory stores a computer program which is executable by the processor and when executing the program, the processor is configured to:

acquire, through a kernel engine of the kernel engine layer, to-be-processed blockchain data, wherein the kernel engine of the kernel engine layer is generated by developing a function of a consensus component of the kernel component layer;

call, through the kernel engine of the kernel engine layer, a consensus component interface provided by a consensus component adaptor of the kernel engine layer according to the to-be-processed blockchain data, wherein the consensus component adaptor of the kernel engine layer is configured to abstract, according to a kernel component programming specification, the function of the consensus component of the kernel component layer into the consensus component interface which is directly called by the kernel engine of the kernel engine layer;

generate, through the consensus component adaptor of the kernel engine layer, a consensus component call request according to a consensus instruction interface of the consensus component of the kernel component layer provided by the consensus component adaptor of the kernel engine layer in response to the consensus component interface being called;

call, through the consensus component adaptor of the kernel engine layer, the consensus component of the kernel component layer according to the consensus component call request to process the to-be-processed blockchain data, wherein the consensus component of the kernel component layer is implemented according to a kernel component programming specification and configured to execute a consensus mechanism between blockchain nodes;

wherein types of parameters and a number of the parameters comprised in the consensus component call request are determined according to a preset consensus component programming specification.

11. An electronic device, comprising:

at least one processor; and a memory communicatively connected to the at least one processor;

wherein the memory stores instructions executable by the at least one processor to cause the at least one processor to perform the method of claim 1.

12. A non-transitory computer-readable storage medium storing computer instructions for causing a computer to execute the method for operating a blockchain system of claim 1.

* * * * *